E. V. BRISTER.
NUT LOCK.
APPLICATION FILED JAN. 4, 1909.
974,352.
Patented Nov. 1, 1910.
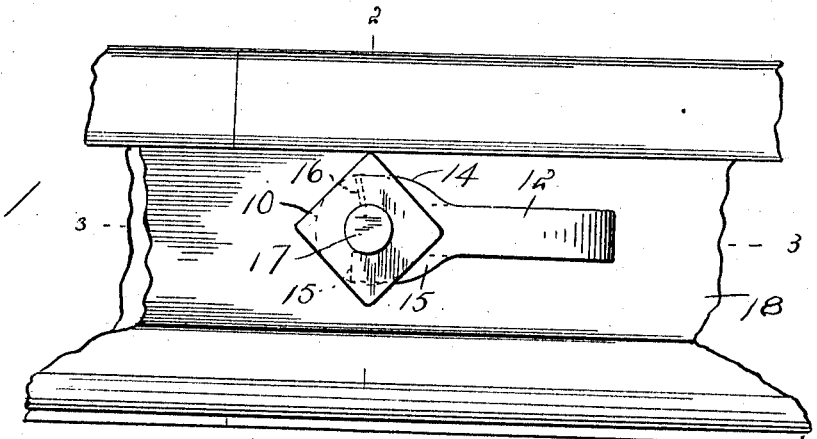
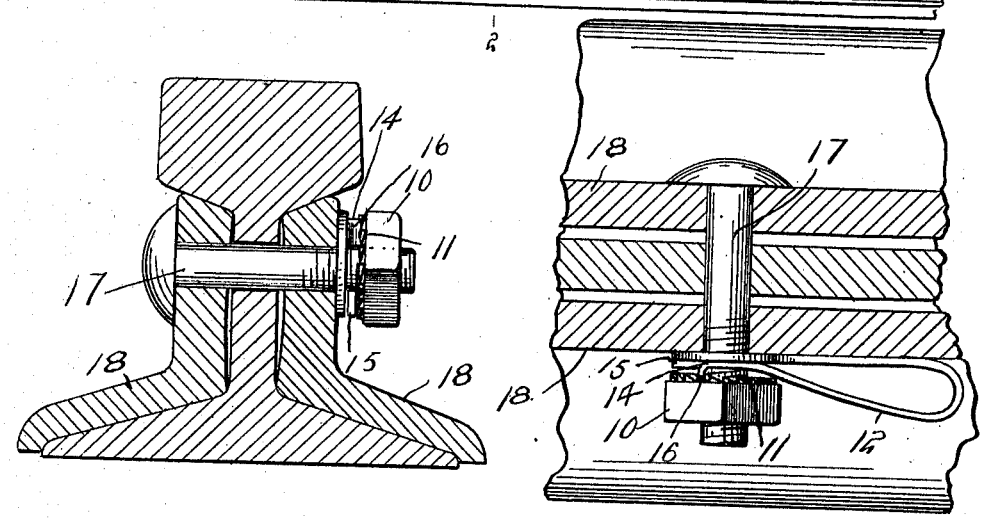
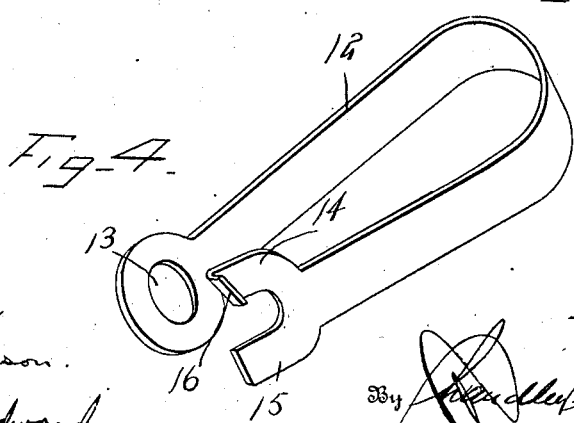
Witnesses
J. C. Simpson
C. H. Woodward
Inventor
Edward V. Brister.
By
Attorneys

UNITED STATES PATENT OFFICE.

EDWARD V. BRISTER, OF RUTH, MISSISSIPPI.

NUT-LOCK.

974,352.  Specification of Letters Patent.  Patented Nov. 1, 1910.

Application filed January 4, 1909. Serial No. 470,687.

*To all whom it may concern:*

Be it known that I, EDWARD V. BRISTER, a citizen of the United States, residing at Ruth, in the county of Lincoln, State of Mississippi, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks, and has for one of its objects to simplify and improve the construction and increase the efficiency and utility of devices of this character.

Another object of the invention is to provide a simply constructed device which may be applied to bolts of various sizes, and to bolts employed for various purposes.

With these and other objects in view the invention consists generally in a plate of resilient material having an aperture at one end, and the other end forked with one of the terminals of the forked portions directed laterally, and a nut having a plurality of radial notches in its inner face, the apertured and forked portions of the resilient member adapted to engage over a bolt with the laterally directed terminal adapted to engage in the notches of the nut.

The invention further consists in certain novel features of construction as hereafter shown and described and then specifically pointed out in the claim.

The improved device may be applied to nuts and bolts of various sizes, and to bolts employed for various purposes, but the improved device is particularly adapted for use in connection with the clamp bolts and nuts of railway rail joints, and for the purpose of illustration is shown thus applied, and in the drawings, Figure 1 is a side elevation of a railway rail joint with the improvement applied. Fig. 2 is a section on the line 2—2 of Fig. 1. Fig. 3 is a section on the line 3—3 of Fig. 1 with the bolt and its nut and the locking device in elevation. Fig. 4 is a perspective view of the locking feature of the improved device detached.

The improved device comprises two main portions, a nut 10 having a plurality of radial notches 11 in its inner face, the notches preferably in ratchet tooth form, or inclined at one side, and a locking device formed of a plate 12 of resilient material, preferably of spring steel, bent centrally into U-shape with an aperture 13 at one end and forked at the other end to produce two spaced portions 14—15, one of the forked portions directed laterally at its terminal, as represented at 16.

The aperture 13 is designed to be placed over the clamp bolt 17 and against the adjacent clamp or "fish" plate 18, and the forked members 14—15 located upon opposite sides of the bolt outside of the apertured end and next to the nut 10, so that when the nut is turned "home" by the wrench the two sides of the member 12 will be compressed and the laterally directed terminal 16 engage with the teeth 11, and thus effectually prevent any retrograde movement of the nut, while at the same time permitting the forward movement of the nut as will be obvious.

By this simple means a simply constructed and effectual locking device is produced which will effectually hold the nut, while at the same time the nut can be released by simply detaching the inwardly directed terminal 16 by a suitable implement, and rotating the nut backwardly.

The improved device is simple in construction, can be inexpensively manufactured, and as before stated, applied to bolts and nuts of various forms and sizes, and it is not desired therefore to limit the improved device to bolts and nuts of any specific construction.

What is claimed, is:—

The combination of a bolt, of a nut on the bolt having ratchet teeth concentric to the bolt opening and on the under side of the nut, of a locking plate comprising a bowed strip of resilient material having one end provided with an eye for the reception of the bolt and the other end forked and straddling the bolt, one of the arms of said forked end being bent at right angles to the remainder of the arm and disposed radially of the nut for engaging the ratchet teeth on the latter.

In testimony whereof, I affix my signature, in presence of two witnesses.

EDWARD V. BRISTER.

Witnesses:
   B. B. BRISTER,
   Q. A. FURR.